Jan. 31, 1956 B. D. BEDFORD 2,733,306

RAPID RESPONSE SELF-SATURATING MAGNETIC AMPLIFIER

Filed July 29, 1952 2 Sheets-Sheet 1

Inventor:
Burnice D. Bedford,
by Paul A. Frank
His Attorney.

Jan. 31, 1956 B. D. BEDFORD 2,733,306

RAPID RESPONSE SELF-SATURATING MAGNETIC AMPLIFIER

Filed July 29, 1952 2 Sheets-Sheet 2

Inventor:
Burnice D. Bedford,
by Paul A. Frank
His Attorney.

United States Patent Office 2,733,306

Patented Jan. 31, 1956

2,733,306

RAPID RESPONSE SELF-SATURATING MAGNETIC AMPLIFIER

Burnice D. Bedford, Scotia, N. Y., assignor to General Electric Company, a corporation of New York Application July 29, 1952, Serial No. 301,447

14 Claims. (Cl. 179—171)

Figure 1:
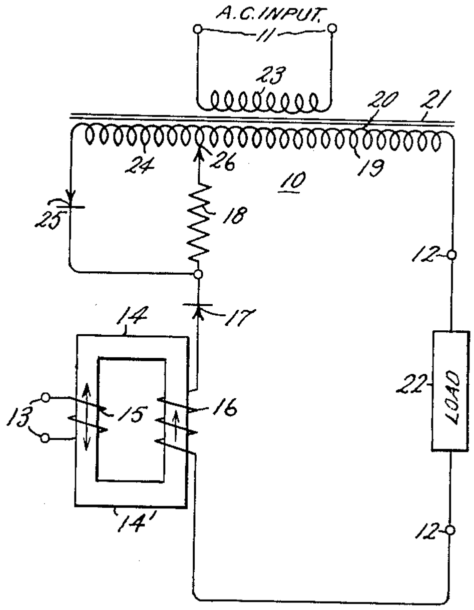

My invention relates to electric control circuits employing the magnetic characteristic of a saturable reactor as the control parameter, which circuits have become known as "magnetic amplifiers."

In one type of magnetic amplifiers, known as "self-saturating" magnetic amplifiers, unidirectional conducting members or rectifiers are connected in series with the load current controlling windings of the saturable reactor included therein and serve to provide through these load windings a unidirectional component of load current which biases the reactor to a predetermined operating point on its magnetic saturation characteristic. Such self-saturating magnetic amplifiers respond very rapidly to changes in one direction of a signal current passed through the control winding of the saturable reactor, but respond less rapidly to signal current changes in an opposite direction. This difference in speed of response to transient signal currents varying in opposite directions is especially apparent and objectionable in full wave type self-saturating magnetic amplifiers having parallel circuit paths for the load current, which parallel paths provide an auxiliary circuit path excluding the load for a circulating current induced by transient signal currents varying in a particular direction. This circulating current acts as an electrical inertia, retarding the speed of response of the magnetic amplifier.

Accordingly, one object of the present invention is to provide self-saturating magnetic amplifiers which respond very rapidly to high speed signal current changes in either an increasing or decreasing direction.

Another object is to provide circuit means for increasing speed of response of self-saturating magnetic amplifiers to transient signal currents varying in a direction capable of inducing auxiliary currents in circuit paths or loops including the load winding of its saturable reactor.

An additional object is to provide full wave type self-saturating magnetic amplifiers having substantially equal speed of response to transient signal current changes in either direction.

A further object is to provide circuit means for reducing transient signal-current-induced circulating currents in the parallel load current carrying paths of a full wave self-saturating magnetic amplifier with substantially no reduction in the amplitude of magnetic amplifier output voltage.

A further object is to provide self-saturating magnetic amplifiers having substantially equalized and uniform speed of response to transient signal current changes in either direction despite differences in the magnitude of load current supplied by the magnetic amplifier.

A still further object is to provide push-pull self-saturating magnetic amplifiers having substantially equal speed of response to transient signal current changes in either direction and also having greater sensitivity since output current losses caused by currents circulating among the various load current supplying branches of the push-pull circuit are minimized.

In general, I have found that the sluggishness in the response of self-saturating magnetic amplifiers to signal current changes in one direction is due to a resulting voltage induction in the load windings of the saturable reactors. This induced voltage produces in a closed loop circuit of the magnetic amplifier an auxiliary current only in the direction permitted by the load-current-carrying rectifiers normally included in this closed loop circuit. In accord with the invention, an impedance element is included in series with each load winding in the offending closed loop circuit, and means are provided for impressing a bias voltage across these impedance elements having a polarity to produce an auxiliary current through these impedance elements in the same direction as the direction of load current also flowing through these impedance elements. The voltage drop across these impedance elements opposes the voltage induced in the load windings by signal current transients in the "slow response" direction, and prevents the undesired signal-induced circulating currents. The bias voltage is preferably derived from a rectification of an alternating voltage 180° out-of-phase with the alternating voltage source for the magnetic amplifier such that the auxiliary biasing current through each impedance is out-of-phase with the load current therethrough and thus does not interfere with this load current. These impedance elements may be of the type having a non-linear impedance characteristic to help maintain a desired total voltage drop across these impedance elements even with relatively low values of load current.

Figure 2:
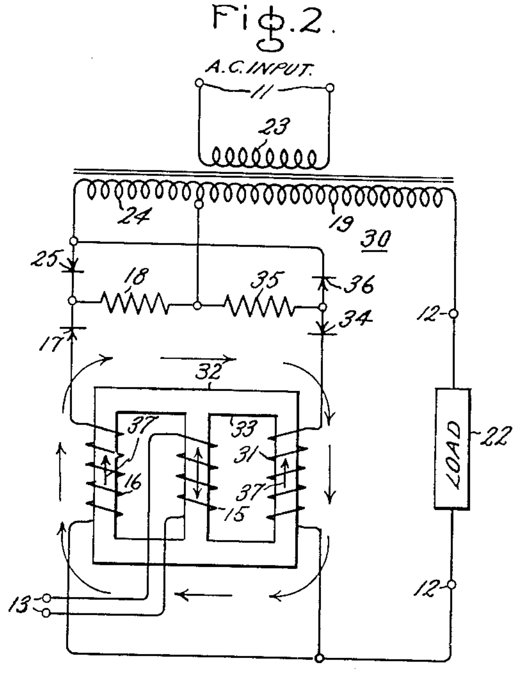
Figure 3:
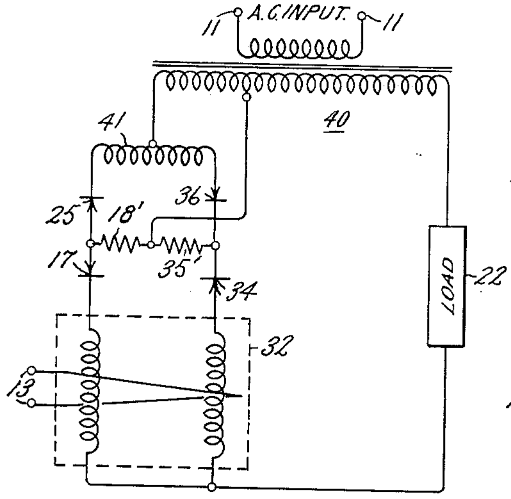
Figure 4:
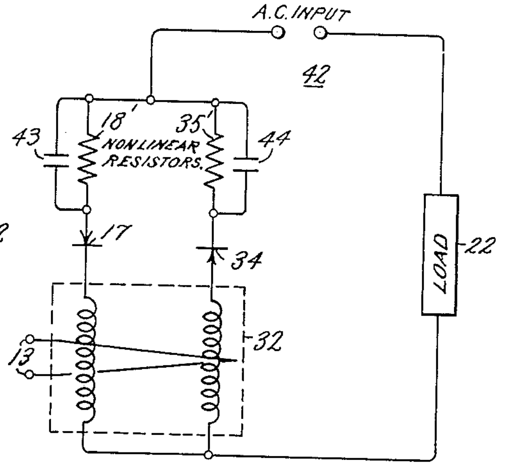
Figure 5:
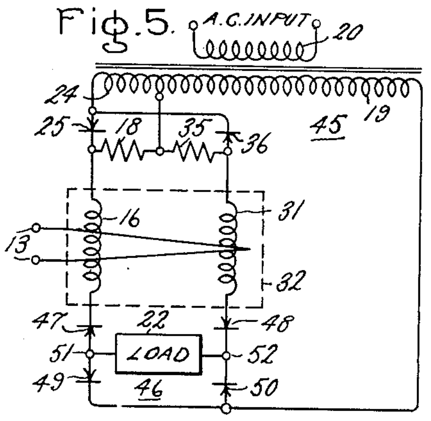
Figure 6:
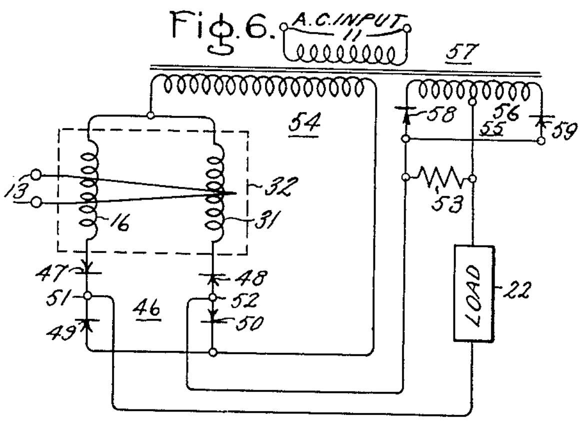
Figure 7:
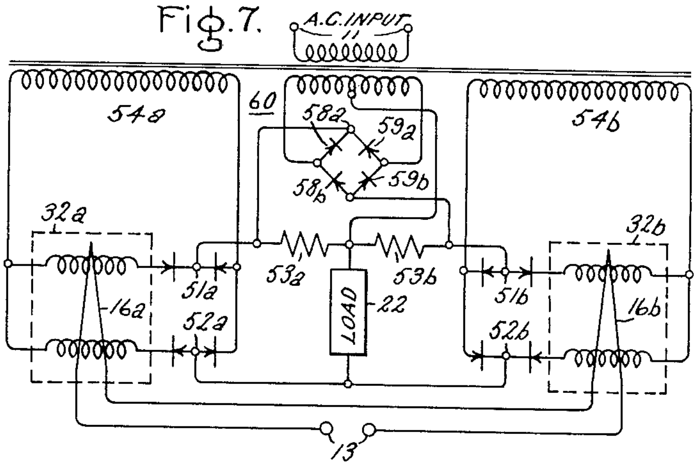
Figure 8:
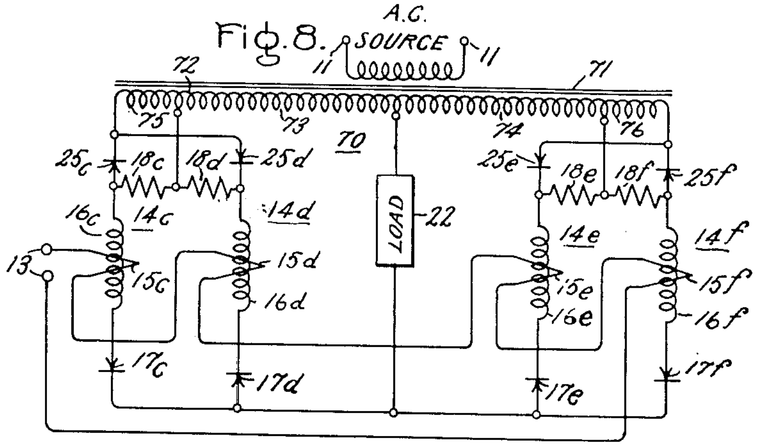

The novel features which are believed characteristic of the invention are set forth in the appended claims. The invention itself, however, together with further objects and advantages thereof may best be understood by referring to the following description taken in connection with the accompanying drawings in which Fig. 1 is a circuit diagram of a half-wave self-saturating magnetic amplifier illustrative of the basic principles involved in the invention; Fig. 2 is a circuit diagram of a full-wave self-saturating magnetic amplifier incorporating the invention and capable of supplying an alternating current to an electric load device; Figs. 3 and 4 are circuit diagrams illustrating various modifications and improvements of the magnetic amplifier circuit of Fig. 2; Figs. 5 and 6 are circuit diagrams of bridge-type self-saturating full wave magnetic amplifiers capable of supplying unidirectional current to an electrical load and incorporating the invention; while Figs. 7 and 8 are circuit diagrams of push-pull full wave self-saturating magnetic amplifiers embodying the invention.

Referring to Fig. 1, there is shown a half-wave self-saturating type magnetic amplifier 10 having alternating current receiving input terminals 11, output terminals 12 and control signal input terminals 13. Magnetic amplifier 10 includes a saturable reactor 14 having a load winding 16 and a control winding 15 arranged on a suitable magnetically saturable core member 14'. Control winding 15 is connected across signal input terminals 13. Load winding 16 is connected in series circuit relation with a unidirectionally conducting member shown as rectifier 17, an impedance element shown as resistor 18, a source of alternating voltage shown as portion 19 of a tapped secondary winding 20 of an input transformer 21, and a load device 22 connected between output terminals 12. The primary winding 23 of transformer 21 is connected to receive power from an alternating current source connected to terminals 11. A bias voltage is impressed across resistor 18 from a source of alternating voltage such as the remaining portion 24 of transformer secondary winding 20 connected in series with resistor 18 through another rectifier 25. The alternating voltage provided by transformer portion 24 is, of course, 180° out-of-phase with the alternating voltage provided by transformer portion 19. Tap 26 of transformer secondary winding 20 may be made adjustable, as indicated, in order to control the relative values of the two alternating voltages provided by transformer secondary winding portions 19 and 24. Alternatively, transformer secondary portions 24 and 19 may be independent secondary windings of transformer 21. Rectifier 25 is polarized relative to rectifier 17 so as to produce a bias current in resistor 18 having the same direction as the load current flowing therethrough. The voltage drop produced by this biasing current across resistor 18 thus has a polarity to oppose any transient signal induced load circuit currents having a duration greater than the period of one cycle of the alternating current supplied to A.-C. input terminals 13 and having the direction of easy flow as permitted by rectifier 17.

In the operation of the magnetic amplifier of Fig. 1, an alternating voltage developed across transformer secondary winding portion 19 produces rectified unidirectional current pulses through the series load circuit including load device 22, load winding 16, rectifier 17, and resistor 18. The unidirectional component of the pulsating current flowing in load winding 16 tends to produce a unidirectional component of magnetic flux in reactor 14 such that the impedance of reactor 14 varies about a self-biased operating point upon its magnetic saturation characteristic. A signal current produced in control winding 15 by a signal supplied to input terminals 13 produces flux in reactor 14 which either aids or opposes the magnetic flux produced therein by the current in load winding 16, and thus either accelerates or retards the time of saturation of reactor 14. The magnitude of the voltage between output terminals 12 and of the current passing through load 22 is thus controlled by the signal current flowing through load winding 15. Due to the blocking action of rectifier 25, no bias current flows through resistor 18 throughout the half-cycle of the input alternating voltage during which load current flows through load winding 16, rectifier 17, and resistor 18. During the alternations of source voltage in which load current is blocked by rectifier 17, bias current is permitted to flow through resistor 18 by rectifier 25. With this biasing arrangement, the bias voltage produced across resistor 18 does not interfere with the current flowing through load device 22 during the active half-cycle periods of magnetic amplifier 10.

The increased speed of response resulting from the inclusion of the biased impedance element 18 may be easily understood by considering the currents which tend to flow in the magnetic amplifier 10 as a result of voltages induced in load winding 16 by a changing magnetic flux in core 14' of reactor 14 when the signal current flowing through control winding 15 varies rapidly in either direction.

Transient changes in signal current flowing in one direction through winding 15 induce a voltage in load winding 16 which tends to produce a current in the load circuit which is blocked by rectifier 17 and thus has little or no effect upon the speed of response of the magnetic amplifier circuit. Transient signal currents in an opposite direction, however, induce voltages in load winding 16 having a polarity to produce a current in load circuit in the easy-flow direction of rectifier 17. Such induced load circuit currents tend to delay the effect of the signal current change upon the impedance of load winding 16 to the load current produced by the alternating voltage developed across secondary winding portion 19 of transformer 21. This transient signal induced current thus acts as an electrical inertia which retards the response of the magnetic amplifier to control winding signal currents which change rapidly in this latter direction.

The magnitude of this signal induced circulating current is, of course, reduced somewhat by the presence of load device 22 and resistor 18 in the circulating current circuit. This tends to improve the speed of response of the magnetic amplifier, but does not completely eliminate the undesirable effects of even such small circulating currents. The application of sufficient bias voltage across impedance 18 from voltage source 24 and rectifier 25, however, completely counteracts any such induced voltage and thus prevents even small transient signal-current-induced circulating currents.

It will also be appreciated that the voltage drop produced across load winding 16 and rectifier 17 by the load current derived from the voltage across transformer secondary winding portion 19 helps to reduce the extent of the voltage induced in load winding 16 by transient changes in signal current supplied through control winding 15. This help is rather insignificant, however, if the load device 22 has high impedance or if the output current of magnetic amplifier 10 is controlled to a small value.

Referring now to Fig. 2, there is shown a full-wave self-saturating magnetic amplifier 30 embodying the invention and capable of supplying an alternating current to load device 22. In magnetic amplifier 30 of Fig. 2, the components corresponding to those described in connection with magnetic amplifier 10 of Fig. 1 are designated by similar reference numerals. In magnetic amplifier 30 a saturable reactor 32 preferably having a three-legged core member 33 with an additional load winding 31 replaces saturable reactor 14 of magnetic amplifier 10.

An additional load current supplying series circuit including load winding 31, a rectifier 34, and another impedance element shown as resistor 35 is connected in parallel with the previously described load current supplying circuit comprising load winding 16, rectifier 17, and resistor 18. A bias voltage is impressed across resistor 35 by connecting the resistor 35 across transformer secondary winding portion 24 through another rectifier 36. Rectifiers 17 and 34 are reversely polarized relative to each other to enable conduction in their respective circuit branches during alternate half-cycles of the alternating voltage developed across the transformer secondary winding portion 19. Windings 16 and 31 are relatively wound or connected in their respective circuits to produce during their conductive periods magnetic flux having the same direction in core 33, as indicated by arrows 37. A signal current supplied to control winding 15 on the central leg of core 33 thus simultaneously affects and controls the impedance of both load windings 16 and 31 in the same manner.

In the operation of the magnetic amplifier 30, current flows in one direction through load device 22 and the circuit branch comprising load winding 16, rectifier 17, and resistor 18 during one polarity alternations of the alternating voltage developed across transformer secondary winding portion 19; while current flows in an opposite direction through load device 22 and the circuit branch comprising load winding 31, rectifier 34, and resistor 35 during the alternations of the transformer developed voltage having opposite polarity. During the half-cycle periods that current is flowing in circuit branch including load winding 16, rectifier 17, and reisstor 18, a bias voltage is impressed across resistor 35 due to the rent passed by rectifier 36 and derived from the voltage developed across transformer secondary winding portion 24. During the half-cycle periods that current is flowing in the branch circuit including load winding 31, rectifier 34, and resistor 35, a bias voltage is impressed across resistor 18 in a similar manner through rectifier 25.

The increased speed of the response obtainable with full-wave magnetic amplifier 30 over similar conventional full-wave self-saturating magnetic amplifiers can be easily understood by considering the voltages induced in load windings 16 and 31 with a rapid change in current supplied through control winding 15, and with resistors 18 and 35 short-circuited, as is the case in conventional self-saturating magnetic amplifiers of this type. Under these conditions there is a closed loop series circuit between the two parallel-connected load supplying branches, which closed loop circuit includes load winding 16, rectifier 17, rectifier 34, and load winding 31. This closed loop circuit provides an easy path for circulating current having a direction corresponding to the easy flow direction of rectifiers 17 and 34. It is to be noted that load device 22 is not included in this closed loop circuit and does not impede the flow of such circulating current. Moreover, the transient signal induced voltages in load windings 16 and 31 have a mutually additive polarity in this closed loop circulating current path. Full wave magnetic amplifiers such as magnetic amplifier 30 with resistors 18 and 35 short circuited, therefore ordinarily produce more circulating current and are more sluggish in response to control signals changing in the slow-response direction than half-wave magnetic amplifiers which include the load in the circulating current path; especially where load 22 has high impedance, reducing the load current to a relatively small value. The inclusion of resistors 18 and 35 functions, in itself, to reduce the undesired circulating current, and the application of sufficient bias voltage across these resistors can substantially eliminate such circulating current to make magnetic amplifier 30 respond rapidly to transient signal currents varying in either direction. Since the bias voltages are impressed across resistors 18 and 25 during their respective non-load-current conducting periods, this bias voltage does not interfere with the operation of the magnetic amplifier circuit. The speed of response of magnetic amplifier 30 can, of course, be adjusted by merely varying the extent of the bias voltage impressed across resistors 18 and 35. I have found that a magnetic amplifier circuit 30 destined to cover the complete control range within 10 cycles of the alternating voltage source requires a bias voltage sufficient to produce a voltage drop across resistors 18 and 35 that is only 5 to 10 percent of the alternating voltage developed across secondary winding portion 19.

Referring now to Fig. 3 there is shown a magnetic amplifier 40 similar to magnetic amplifier 30 but including an additional reactor 41 in the auxiliary bias current circuits. Reactor 41 functions in a well-known manner to change the sinusoidal current passing through resistors 18 and 35 to a rectangular current wave. A bias voltage of substantially constant magnitude is thus always present across the combination of resistors 18 and 35 throughout the entire alternating source voltage cycle. This permits a more uniform change in the magnetic flux due to control winding 15 and enables very effective use of small control voltage signals. The changes in voltage drop across resistors 18 and 35 due to changes in load current as a result of the control exerted by saturable reactor 32 can be minimized by employing non-linear impedance elements 18′ and 35′ such as thyrite resistors or neon lamps in place of linear resistors 18 and 35.

Referring now to Fig. 4, there is shown another alternating current supplying self-saturating magnetic amplifier 42 similar to magnetic amplifier 30 but incorporating a self-biasing arrangement for the impedance elements added in the parallel load current supplying branches. In Fig. 4 non-linear impedance elements 18′ and 35′ such as thyrite or neon lamps are preferably employed in place of the linear resistors 18 and 35 of magnetic amplifier 30, and capacitors 43 and 44 are respectively connected across each non-linear resistor 18′ and 35′. In this arrangement, the voltage drop across non-linear resistors 18′ and 35′ is maintained substantially constant by virtue of their non-linear characteristic regardless of changes in load current passing therethrough. Capacitors 43 and 44 function to maintain this voltage drop across these resistors during their non-load-current-carrying half-cycle periods. This arrangement is particularly advantageous and effective when magnetic amplifier 42 is destined to supply appreciable current to load device 22.

Referring now to Fig. 5, I have shown my invention in connection with a bridge-type self-saturating magnetic amplifier 45 designed to pass unidirectional current to a load device 22. In magnetic amplifier 45, load windings 16 and 31 of saturable reactor 32 and resistors 18 and 35 are included in respective alternately conducting paths of a full-wave bridge type rectifier 46 including rectifier elements 47, 48, 49, and 50. Secondary winding portion 19 of input transformer 20 is connected to supply power to the bridge rectifier including saturable reactor 32. Load device 22 is connected across the direct current output terminals 51 and 52 of bridge rectifier 46. Auxiliary unidirectional pulsating bias currents are supplied through resistors 18 and 35 by connecting these resistors across secondary winding portion 24 through rectifiers 25 and 36 in the same manner as in Fig. 2.

In magnetic amplifiers similar to circuit 45 with resistors 18 and 35 short circuited, the circulating path for signal-induced load winding currents comprises load winding 16, rectifier 47, load 22, resistor 53, rectifier 48, and load winding 31. Since load device 22 is included in the circulating current path, the magnitude of induced circulating current in magnetic amplifier 45 is not as great as those induced in magnetic amplifiers 30, 40, or 42 shown in Figs. 2, 3, and 4. However, with load devices 22 having fairly low impedance, this circulating current can still be quite objectionable if high speed of response is required. The inclusion of resistors 18 and 35 in this induced circulating current loop circuit together with the application of bias voltages thereacross as shown in Fig. 5, prevents any such transient control signal induced circulating currents, and thus functions to accelerate the response of magnetic amplifier 45 to signal current changes in the normally slow direction.

In Fig. 6, there is shown a bridge type self-saturating direct current magnetic amplifier 54 similar to that of Fig. 5 but having a single resistor 53 which serves the purpose of the two resistors 18 and 35 of Fig. 5. Resistor 53 is connected in series with load 22 across output terminals 51 and 52 of bridge rectifier 46. An auxiliary unidirectional bias current is passed through resistor 53 by means of a full wave biasing circuit 55 which replaces the biasing circuit comprising secondary winding portion 24 and rectifiers 25 and 36 of Fig. 5. Full wave biasing circuit 55 comprises a separate center-tapped secondary winding 56 of an input transformer 57 and a pair of similarly poled rectifiers 58 and 59 connected from one side of resistor 53 to opposite ends of secondary winding 56. Resistor 53 functions to prevent signal induced circulating currents in the same manner as explained above in connection with Fig. 5. However, bias current flows through resistor 53 simultaneously with the load current therethrough, and magnetic amplifier 54 of Fig. 6 thus does not have the added advantage of the out-of-phase pulsating biasing arrangement of magnetic amplifier 45 of Fig. 5.

Referring now to Fig. 7, there is shown a push-pull magnetic amplifier 60 in which two magnetic amplifiers 54a and 54b, each identical with the magnetic amplifier 54 of Fig. 6, have their control windings 16a and 16b connected in series and in reversed flux relation relative to their respective load windings and thus supply a push-pull current to a commonly-connected load device 22. Components of magnetic amplifier 54a corresponding to those of magnetic amplifier 54 are designated by the same reference numerals followed by the letter "a"; while components of magnetic amplifier 54b corresponding to those of magnetic amplifier 54 are also designated by similar reference numerals followed by the letter "b." In this push-pull arrangement of Fig. 7, resistors 53a and 53b function not only to prevent circulating current within their respective associated magnetic amplifiers and thus to increase the speed of response of these magnetic amplifiers, but also function to prevent circulating output current from one magnetic amplifier through the other magnetic amplifier rather than through load device 22. The useful output load current in push-pull magnetic amplifier 60 may be as high as one-half the power rating of one of the included magnetic amplifier sides 54a and 54b. This is about three times the power than can normally be obtained when linear resistors are used without fixed bias to limit a circulating current between two magnetic amplifiers connected in a push-pull circuit.

Referring to Fig. 8, there is shown a push-pull self-saturating magnetic amplifier circuit 70 capable of supplying unidirectional current of either polarity to a load 22 and having the advantage of preventing signal induced circulating currents without reduction in output voltage as well as the advantage of reducing output-load current losses due to undesired currents circulating between various portions of the push-pull circuit. Magnetic amplifier 70 comprises four saturable reactors 14c, 14d, 14e, and 14f corresponding to saturable reactor 14 of Fig. 1 and each including a respective load winding 16c, 16d, 16e, and 16f and a respective control winding 15c, 15d, 15e, and 15f. An input transformer 71 having a center-tapped secondary winding 72 having two out-of-phase voltage developing portions 73 and 74 supplies current to a load device 22 through four parallel circuit branches whose currents are respectively controlled by the four saturable reactors. Rectifier 17c and resistor 18c are connected in series with load winding 16c and load 22 across secondary winding portion 73 to form one branch. Rectifier 17d and resistor 18d are connected in series with load winding 16d and load 22 across secondary winding portion 73 to form a second branch. Rectifiers 17e and 18e are connected in series with load winding 16e and load 22 across secondary winding portion 74 to form a third branch, while rectifier 17f and resistor 18f are connected in series with load winding 16f and load 22 across secondary winding portion 74 to form a fourth branch. Rectifiers 17c and 17d are reversely poled to pass current through their respective branches during alternate half-cycles of an alternating voltage provided by secondary winding portion 73, while rectifiers 17e and 17f are also reversely poled to pass current through their respective branches during alternate half-cycles of an alternating voltage provided by secondary winding portion 74. Since the output voltage of secondary winding portion 73 is 180° out-of-phase with that of secondary winding portion 74, current tends to flow in the branches including rectifiers 17c and 17e during one polarity alternation of an alternating voltage source supplied to transformer 72, while current tends to flow in the branches including rectifiers 17d and 17f during source voltage alternation having opposite polarity. Control windings 15c, 15d, 15e, and 15f are all connected in series across input terminals 13 such that an input signal of one polarity, such as positive, aids the saturation of reactors 14c and 14f while it retards the saturation of reactors 14d and 14e. Load windings 16c, 16d, 16e, and 16f may alternatively be wound on separate legs of a single saturable core member (not shown) and a single control winding (not shown) substituted for the four central windings shown. A positive control signal, for example, may cause load current of one polarity to flow predominately through the branch including load winding 16c during positive half-cycles of source voltage, and through the branch including winding 16f during negative source voltage alternations, while a negative control signal may cause load current of opposite polarity to flow predominately through the branch including load winding 16e during positive source voltage alternations and through the branch including winding 16d during negative source voltage alternations.

In accord with the invention, two pairs of rectifiers 25c, 25d, and 25e, 25f are each connected in the same manner as rectifier 25 of Fig. 1 across the two pairs of resistors 18c, 18d and 18e, 18f to supply pulsating biasing current from auxiliary secondary winding portions 75 and 76 through the added resistors 18c, 18d, 18e and 18f in the same direction but 180° out-of-phase with their respective load circuit currents. The bias voltage developed across resistors 18c and 18d prevent transient signal induced circulating current in the circuit path including load winding 16c, rectifier 17c, rectifier 17d, and load winding 16d, while bias voltage across resistors 18e and 18f similarly prevent transient signal induced circulating current in the circuit path including load winding 16e, rectifier 17e, rectifier 17f, and load winding 16f.

In addition, resistors 18c, 18d, 18e and 18f function to prevent the circulation of direct current from one side of the push-pull circuit to the other as a result of a unidirectional component of load current. Presume, for example, that a positive signal supplied to input terminals 13 saturates or accelerates the saturation of reactors 14c and 14f. With such positive signal and during positive half-cycles of source voltage supplied to terminals 11, load current flows through the load circuit branch including load winding 16c, and bias current flows through resistors 18d and 18f. During negative half-cycles of source voltage supplied to terminals 11, load current flows through the load circuit including load winding 16f, and bias current flows through resistors 18c and 18e. The pulsating bias voltages developed across resistors 18d and 18e have a polarity opposing and reducing or, if great enough, completely extinguishing, any unidirectional component of load current which tends to flow in the branches including load windings 16d and 16e under such positive control winding signal conditions. With a negative signal supplied to control winding terminals 13, load windings 16d and 16e become alternately conductive, and the pulsating bias voltages developed across resistors 18c and 18f function in the same manner to prevent circulating currents between the two sides of the push-pull circuit.

Although I have described above particular embodiments of my invention, many modifications can be made, and it is to be understood that I intend to cover by the appended claims all such modifications as fall within the true spirit and scope of the invention.

What I claim as new and desire to secure by Letters Patent of the United States is:

1. A control circuit comprising a saturable reactor having a load winding and a control winding, a pair of conductors for connection to an alternating current source, a series circuit connected between said conductors comprising an impedance element, a rectifier, said load winding, and output terminals for connection to an electric load device whereby rectified current produced in said series circuit through a pulsating interconnected load device is controllable by a signal current supplied to said control winding, and means for supplying an auxiliary current through said impedance element in the same direction as said rectified series circuit current only when current in said circuit is blocked by said rectifier.

2. A control circuit comprising a saturable reactor having a load winding and a control winding, a source of alternating voltage, a pair of output terminals for connection to an electric load device, a series circuit connected across said output terminals comprising an impedance element, a rectifier, said load winding, and said alternating voltage source, and means for supplying a pulsating voltage across said impedance element having a polarity to produce current therein having the same direction as a rectified current produced in said series circuit from said alternating voltage source and only when current in said impedance is blocked by said rectifier.

3. A magnetic amplifier control circuit comprising a pair of conductors for connection to an alternating voltage source, a saturable reactor having a load winding and a control winding, a series circuit connected between said conductors comprising an impedance element, a rectifier, said load winding and a load device, and means connected across said impedance element for supplying auxiliary current pulses through said impedance element having the same direction as, and occurring during the time intervals between, the rectified current pulses produced in said series circuit.

4. A control circuit comprising a pair of conductors for connection to an alternating voltage source, a saturable reactor having a load winding and a control winding, a series circuit connected to receive an alternating voltage derived from a voltage supplied to said conductors comprising an impedance element, a rectifier, said load winding and an electric load device, and means including a rectifier connected across said impedance element for supplying an auxiliary rectified current through said impedance element having the same direction as, and occurring during the time intervals between rectified current produced in said series circuit.

5. A control circuit comprising a saturable reactor having a load winding and a control winding, a transformer for providing two alternating voltages when connected to an alternating voltage source, a first series circuit connected to be energized by one of said transformer output voltages comprising an impedance element, a first rectifier, said load winding, and an electric load device, and a second series circuit connected to be energized by the other of said transformer output voltages comprising a second rectifier and said impedance element, said second rectifier being half wave and polarized to supply current through said impedance element having the same direction as, and occurring during the time intervals between the rectified current produced therein from said first series circuit.

6. A magnetic amplifier control circuit comprising a transformer having a pair of secondary windings, a saturable reactor having a load winding and a control winding, a pair of conductors for connection to an electric load device, a first series circuit connected between said conductors comprising an impedance element having a non-linear impedance characteristic to currents of different magnitude, a first rectifier, said load winding, and one of said secondary windings, and a second series circuit connected across said impedance element comprising a second rectifier and the other secondary winding, said second rectifier being half wave and polarized to supply current through said impedance element having the same direction as the rectified current produced therein from said first series circuit.

7. A control circuit comprising a self-saturating magnetic amplifier having at least one output circuit for supplying unidirectional current pulses to a load device, an impedance element connected in series with said output circuit, and means connected across said impedance element for supplying through said impedance element auxiliary current pulses having the same direction as, and occurring during the time intervals between, the output circuit current pulses therethrough.

8. A fast-response magnetic amplifier comprising an alternating current source, a saturable reactor having a pair of load windings and a control winding, a first series circuit comprising a first impedance element, a first rectifier and one of said load windings connected to supply current from said source in one direction to a load device, a second series circuit comprising a second impedance element, a second rectifier and the other load winding connected to supply current from said source in the opposite direction through a load device, and means for producing a pulsating auxiliary current in each impedance element having the same direction as the load current produced therein by the series circuit in which it is connected, said pulsating auxiliary current being supplied only when current in said associated series circuit is blocked by said rectifier therein.

9. A fast-response magnetic amplifier comprising an alternating current source, a saturable reactor having a pair of load windings and a control winding, a first series circuit comprising a first impedance element, a first rectifier, and one of said load windings connected to supply current from said source in one direction to a series-connected load device, a second series circuit comprising a second impedance element, a second rectifier and the other load winding connected to supply current from said source in the opposite direction to said series-connected load device, and a separate capacitor connected in parallel with each impedance element.

10. The magnetic amplifier of claim 9 wherein the impedance elements have nonlinear impedance characteristics to currents of different magnitude.

11. A magnetic amplifier circuit comprising a bridge type rectifier for connection to an alternating voltage source, an electric load device connected in the rectified output current path of said bridge rectifier, a saturable reactor having two load windings and a control winding, a pair of impedance elements, each load winding and each impedance element being connected in a different alternate rectification circuit path of said bridge rectifier, and biasing means connected across each impedance element for supplying auxiliary unidirectional current through said impedance element having the same direction as the load current therethrough.

12. A magnetic amplifier comprising a transformer having a tapped secondary winding, a conductor, output terminals for connecting a load device between said conductor and said tap, saturable reactor means comprising two load windings and saturation control means for simultaneously controlling the impedance of said load windings, a first circuit branch including a first rectifier, one of said load windings and a first impedance element connected in series from said conductor to said secondary winding on one side of said tap, a second circuit branch including a second rectifier, the other load winding and a second impedance element connected in series from said conductor to said secondary winding on the other side of said tap, said first and second rectifiers being polarized to pass current in the same direction through an interconnected load device, and means connected across each impedance element for supplying auxiliary current pulses through each impedance element having the same direction as, and occurring out-of-phase with, the rectified current pulses produced in each impedance element from the series-circuit branch in which it is connected.

13. A push-pull magnetic amplifier comprising a pair of self-saturating magnetic amplifiers, each having two load current controlling circuit branches, a load device connected in common and in series with each load current controlling branch of each magnetic amplifier, four impedance elements each connected in series with a respective load current controlling circuit branch, and means for impressing a bias voltage across each impedance element to produce a pulsating auxiliary biasing current having the same direction as the load current flowing therethrough only on the half-cycles when the load current is not flowing.

14. A push-pull magnetic amplifier comprising a pair of self-saturating magnetic amplifiers each having two load current controlling circuit branches, one branch including a rectifier polarized to pass load current pulses in one direction and the other branch including a rectifier polarized to pass load current pulses in an opposite direction, four impedance elements each connected in series with a respective load current controlling branch of said two magnetic amplifiers, and biasing means connected across each impedance element for producing through each impedance element auxiliary unidirectional current pulses having the same direction as, and occurring between, the load current pulses produced through the impedance element from the current supplying branch in which it is connected.

(References on following page)

References Cited in the file of this patent

UNITED STATES PATENTS

| | | |
|---|---|---|
| 2,229,952 | Whiteley et al. | Jan. 28, 1941 |
| 2,388,070 | Middel | Oct. 30, 1945 |
| 2,554,203 | Morgan | May 22, 1951 |
| 2,571,708 | Graves | Oct. 16, 1951 |

FOREIGN PATENTS

| | | |
|---|---|---|
| 613,082 | Great Britain | Nov. 22, 1948 |

OTHER REFERENCES

A. I. E. E. Mis. Paper 50–93 on "Magnetic Amplifiers of the Balanced Detecter Type" by Geyger, December 1949.